United States Patent [19]

Kuhn

[11] 3,979,292

[45] Sept. 7, 1976

[54] DUPLEX FILTER SYSTEM

[75] Inventor: Charles W. Kuhn, Peoria, Ill.

[73] Assignee: Caterpillar Tractor Co., Peoria, Ill.

[22] Filed: Aug. 10, 1973

[21] Appl. No.: 387,351

[52] U.S. Cl. ............................ 210/90; 210/120; 210/135; 210/136; 210/137; 210/341; 210/436

[51] Int. Cl.² ...................... B01D 35/14; C02C 1/14

[58] Field of Search ............ 210/90, 120, 134, 136, 210/137, 340, 341, 436

[56] References Cited
UNITED STATES PATENTS

| | | | |
|---|---|---|---|
| 2,942,732 | 6/1960 | Edeler | 210/436 |
| 3,715,416 | 2/1973 | Campbell et al. | 210/137 X |

FOREIGN PATENTS OR APPLICATIONS

| | | | |
|---|---|---|---|
| 654,561 | 4/1929 | France | 210/90 |

Primary Examiner—Frank A. Spear, Jr.
Assistant Examiner—Ferris H. Lander
Attorney, Agent, or Firm—Phillips, Moore, Weissenberger, Lempio & Strabala

[57] ABSTRACT

A duplex filter system having two filterized fluid flow circuits for maintaining continuous fluid flow to an engine or similar liquid utilizing device during a filter change operation. A fluid control system is provided including liquid-obstructing air vent means for selectively venting air under pressure from an empty one of said two circuits while retaining fluid under pressure within the other said circuit during charging of said empty circuit, whereby fluid pressure within the system is regulated, and the fluid flow controlled. Detection means for detecting pressure within each of the two circuits.

1 Claim, 1 Drawing Figure

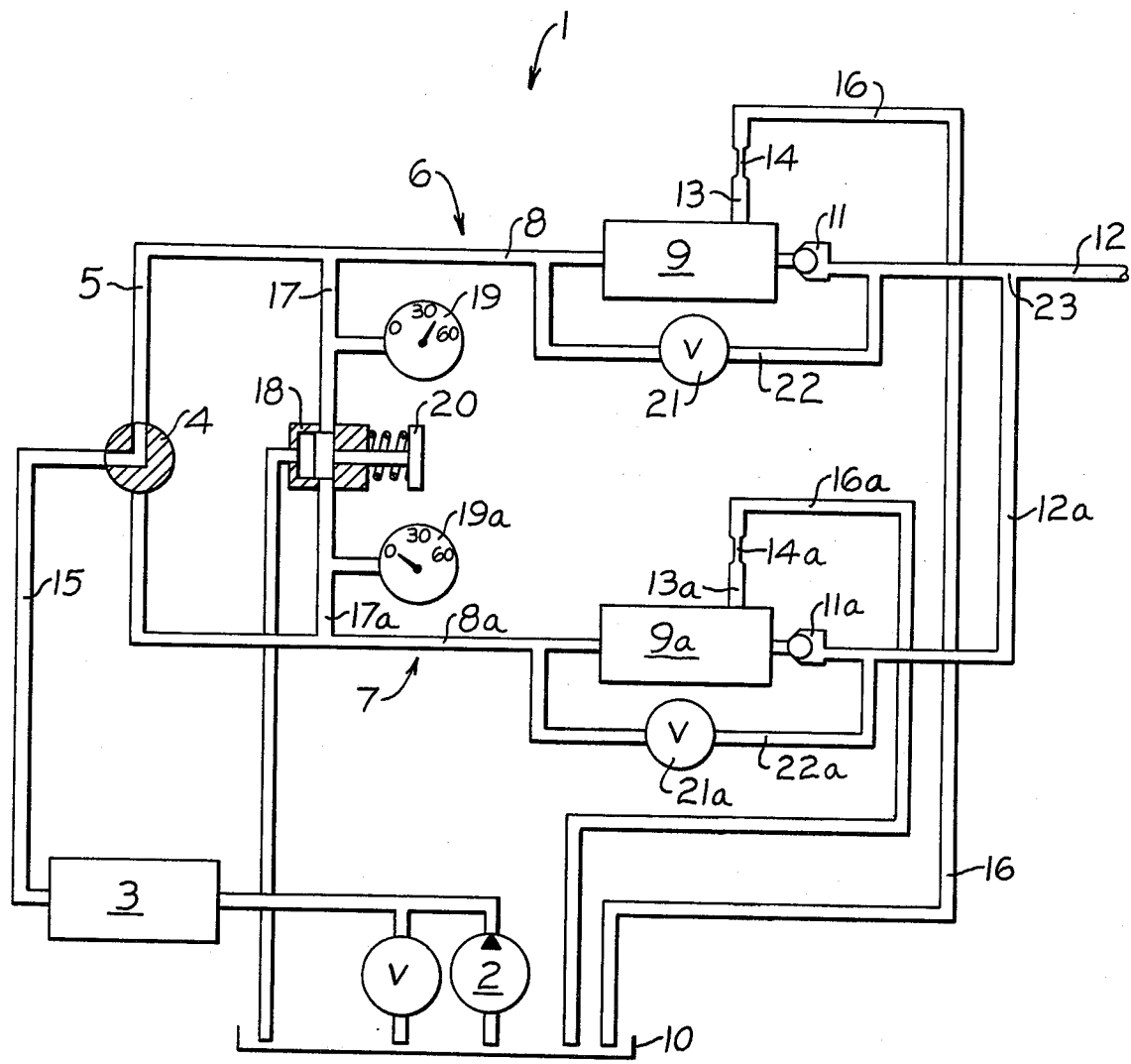

DUPLEX FILTER SYSTEM

BACKGROUND OF THE INVENTION

Fluid flow systems for internal combustion engines and other liquid utilizing devices frequently include filters for the purpose of removing dirt or other foreign materials from the fluid utilized. To permit continuous operation of the engine or other device supplied by such a filterized system, it is frequently desirable to provide a duplex filter system comprising dual filterized fluid flow circuits to permit maintaining the flow of fluid to the engine while a filter change is being made.

The basic duplex filter system employs a primary circuit and an auxiliary circuit arranged in parallel, with a selector valve arranged to selectively direct fluid flow to either of said circuits. Typically, the selector valve is used to direct fluid flow to one circuit while the filter in the other circuit is changed. It is usual to purge the empty or alternate circuit of air prior to discontinuing flow in the working circuit and redirecting it to the alternate circuit by means of a fill valve placed downstream from the selector valve. This fill valve connects the primary and auxiliary circuits, and when opened, permits fluid flow into the empty circuit, thereby replacing any air present in such circuit.

Other components are typically included in such filter systems, such as check valves to prevent reversal of flow within the fluid circuits, filter by-pass valves, and petcocks or drain valves.

It is generally of great importance, for example, when supplying liquid fuel to an engine, that the alternate circuit be completely purged of air prior to redirecting the flow from the working circuit to prevent cavitation and insure a continuous air-free supply to the engine. Conventional means heretofore employed for determining the sufficiency of charge in the alternate circuit and for determining the presence of air therein have frequently been unsatisfactory and of limited usefulness. Typically, petcocks have been provided on conventional purge tubes for the circuits. Such petcocks have been opened on the alternate circuit at the same time as the fill valve and the tubes observed for fluid discharge. When liquid is discharged from an open tube, the associated circuit is considered sufficiently charged, and the fill valve and petcock are closed. The selector valve is then positioned to redirect fluid flow to this circuit.

There are several disadvantages associated with such a method for determining full fluid charge in the alternate circuit. For instance, the attendant fluid spillage is highly undesirable, particularly in confined spaces such as are present in many marine engine applications. Additionally, the purge tube must be more or less continually observed when the petcock is open, so that any liquid discharge may be terminated as quickly as possible. Further, in such conventional systems, there is no means for detecting the presence of fluid pressure in the circuit having the filter to be replaced. This is of importance, since malfunction of any of several conventional components, such as a check valve, may result in an unexpected retention of fluid pressure in the circuit, and a resultant spillage and/or safety hazard during removal of the filters.

SUMMARY AND OBJECTS OF THE INVENTION

The invention comprises a fluid flow control system for safely and efficiently implementing the redirection of fluid flow from a first or working circuit to a second or alternate circuit of a duplex filter system. The system includes liquid-obstructing air vent means and detection means for determining the presence of compressed fluid in the first circuit and the presence of full liquid charge in the second circuit prior to flow redirection to such second circuit and filter removal from the first circuit. The air vent means include a constricted vent tube which selectively vents air from the alternate circuit, thereby eliminating cavitation and permitting the build-up of sufficient liquid pressure to result in the substantially complete charging of the alternate circuit. Detection means comprising pressure gauges are suitably located within the filter system and are employed in conjunction with the air vent means to detect fluid pressurization within the circuits, and thus indicate the presence of full liquid charge in the alternate circuit and the presence or absence of compressed fluid in the working circuit.

It is, therefore, an object of this invention to provide a simple and convenient fluid flow control system for a duplex filter system which effectively regulates the flow of fluid through an alternate circuit thereof.

Another object of this invention is to provide a fluid flow control system for a duplex filter system which indicates safe and suitable conditions for flow redirection and filter change in the circuits thereof.

A further object of this invention is to provide a fluid flow control system in a duplex filter system whereby the presence of full charge in an alternate circuit thereof may be readily determined.

It is another object of this invention to provide a fluid flow control system in a duplex filter system whereby the presence of compressed fluid in the circuit wherein the filter is to be changed may be readily determined.

Yet another object of this invention is to provide a simple and convenient fluid flow control system for duplex filter systems which obviates customary fluid spillage by communicating its venting means with a drain sump.

A still further object of this invention is to provide a simple and convenient method for controlling fluid flow within a duplex filter system whereby safe and suitable conditions for flow redirection and filter change in the circuits thereof may be readily determined.

BRIEF DESCRIPTION OF THE DRAWING

The sole FIGURE is a schematic diagram of a duplex filter system including the flow control system of this invention.

DETAILED DESCRIPTION OF THE INVENTION

With reference to the drawing, a duplex filter system 1 receives fluid under pressure from a supply tank 10. A liquid pump means 2 draws such liquid from the tank and pumps it through a heat exchanger 3. Liquid leaving the heat exchanger 3 flows via a conduit 15 through a two-way selector valve 4 and then through a conduit 5. Selector valve 4 is adapted to direct fluid through either a primary filter circuit 6 or an alternate filter circuit 7. Suitable specific selector valves could include, for example, the selector valve described in U.S. patent application Ser. No. 227,439, filed Feb. 18, 1972, and of common assignment herewith.

Fluid directed to the primary circuit 6 flows through conduit 8 and communicates with a filter 9. A check valve 11 is provided in the outlet manifold 12 of filter 9, which manifold in turn communicates with a liquid receiver or user device (not shown).

The present fluid control system illustrated also includes a vent tube 13 having a constricted portion 14. The vent tube communicates with the filter 9 and to the sump tank 10 via an extension 16, for returning drain fluid safely thereto. A tube 17 also communicates with the tube 8 and with a pressure gauge 19 and push valve 18. A filter by-pass valve 21 is also located in a tube 22 which connects between conduit 8 and manifold 12 and acts as a shunt to selectively pass liquid around filter 9 in the event such filter becomes clogged.

The alternate circuit 7 is arranged in a similar fashion. A vent tube 13a is provided having constriction means 14a for communication with a filter 9a. A pressure gauge 19a is connected within circuit 7 as in circuit 6. Primary circuit 6 and auxiliary circuit 7 are connected together downstream of check valves 11 and 11a at a junction 23 of manifold 12 and outlet conduit 12a. The alternate circuit also has a by-pass valve and conduit 21a, 22a.

During normal system operation, the selector valve 4 directs liquid flow through the filter 9, and pressure within primary circuit 6 is registered on the pressure gauge 19. Since the alternate circuit 7 is closed off from the liquid supply, the pressure in circuit 7 will, under normal conditions, be registered as zero by the pressure gauge 19a. When a filter replacement is required in circuit 6 the fill valve 18 is opened by pushing the element 20 and liquid is permitted to flow to circuit 7. Any air present in circuit 7 will tend to be purged through the vent tube 13a and replaced by liquid entering circuit 7 from conduit 17a. Since the constriction 14a of vent tube 13a offers low resistance to escaping air, little pressure build-up results initially in circuit 7. However, when circuit 7 has been purged of air and is charged with liquid and the liquid encounters the constriction 14a, the resultant obstruction of flow through vent tube 13a creates an increase in pressure. This pressure eventually becomes sufficient to open the check valve 11a, thereby permitting liquid to flow through the tube 12a and manifold 12 to the user device. Pressure gauge 19a constantly detects and registers the pressure in circuit 7 so that the increase is readily appreciable. When the pressures indicated by gauges 19 and 19a are equal, the circuit 7 is fully charged with liquid. The fill valve 18 is then closed, and selector valve 4 is repositioned to direct fluid flow to circuit 7.

After the primary circuit 6 has been thus cut off from the fluid supply, any remaining pressure in circuit 6 will bleed off slowly through the vent tube 13 to the sump 10. Pressure gauge 19 will detect and register the resultant decrease in pressure and indicate when the pressure is suitably low so as to permit filter removal.

In some instances, a malfunctioning component may be encountered when switching from one circuit to the other. For example, when fluid flow is redirected from circuit 6 to circuit 7, the check valve 11 may become stuck in open position, thus mantaining pressure in circuit 6 by the reverse flow of fluid past the junction 23 through tube 12. If this occurs, gauge 19 detects and registers the pressure existing in circuit 6 and indicates a possibly dangerous condition under which the filter 9 should not be removed.

Any component malfunction which causes system pressure to be maintained in a circuit after redirection of fluid flow therefrom may thus be readily detected and registered by the respective gauge 19 or 19a.

If desired, the liquid-obstructing air vent means of this invention may be utilized in other types of duplex filter systems which do not employ pressure gauges. For example, the means could be used in lieu of the above-described petcocks. These vent means would permit full charging of the alternate circuit, including, for example, tubes 12 or 12a prior to redirecting flow to the alternate circuit. The alternate circuit pressure would force open check valve 11a before any substantial discharge of liquid could occur through the constricted vent tube and undue fluid spillage would be obviated by virtue of the connection of such vent tube to the supply sump.

In view of the foregoing, it should be apparent that the present invention provides a vastly improved and efficient system for controlling a duplex filter arragement and for safely conditioning such arrangement for a filter change and redirection of flow. The instant invention virtually eliminates cavitation in the system circuits and avoids spillage and other inconveniences often attendant to prior art systems.

While the invention has been described with particular reference to the preferred embodiment, it is apparent that variations and modifications are possible within the purview of the inventive concepts. No limitation with respect to such variations and modifications is intended, except by the scope of the appended claims.

I claim:

1. In a duplex filter system having two fluid circuits, of the type used in an internal combustion engine, said system including, a working fluid circuit, an alternate fluid circuit, fluid conduit means connecting said circuits to said engine, filter means for filtering foreign materials from said fluid passing through each circuit check valve means proximate an outlet of each of said filter means for preventing reversal of fluid flow in said circuits, by-pass means in each of said circuits for selectively by-passing fluid around said filter means, valve means for redirecting fluid flow through the alternate circuit from said working circuit, means for charging said alternate circuit with liquid while draining fluid from said working circuit to permit a change of filter means in said working circuit, the improvement comprising; a fluid flow control system including liquid obstructing air vent means for selectively venting air from said alternate circuit while charging said circuit with liquid, said air vent means operative to cause liquid pressure to build-up within said alternate circuit sufficiently to open said check valve means associated with said alternate circuit and to permit fluid flow through said check valve to a junction of said alternate circuit and said working circuit, and pressure-detecting means for detecting and registering the pressure in each of said circuits and for indicating when said alternate circuit is fully charged with liquid, and for detecting and registering the pressure level in said working circuit after fluid flow has been redirected to said alternate circuit.

* * * * *